United States Patent [19]

Soufiane et al.

[11] Patent Number: 5,691,013

[45] Date of Patent: Nov. 25, 1997

[54] GLASS TUBING

[76] Inventors: Abdelouahed Soufiane, 2525 Elwood Dr., Unit 108, Ames, Iowa 50010; Gerald J. Shirk, 3414 Ellwinn La. SE., Cedar Rapids, Iowa 52403

[21] Appl. No.: 683,030

[22] Filed: Jul. 16, 1996

[51] Int. Cl.$^6$ ................................................. B32B 13/00
[52] U.S. Cl. ........................................ 428/34.4; 428/34.6
[58] Field of Search .............................. 428/34.4, 34.6; 385/144; 501/54, 55

[56] References Cited

U.S. PATENT DOCUMENTS

| | | | |
|---|---|---|---|
| 4,278,632 | 7/1981 | Yoldas | 264/66 |
| 4,421,803 | 12/1983 | Czeiler | 428/34.6 |
| 4,437,727 | 3/1984 | Treber | 428/34.6 |
| 4,812,344 | 3/1989 | Jaeger | 428/34.6 |
| 4,882,209 | 11/1989 | Maruyama | 428/34.6 |

FOREIGN PATENT DOCUMENTS 1599420  4/1979  United Kingdom ............... 428/34.6

*Primary Examiner*—Timothy Speer
*Attorney, Agent, or Firm*—James C. Nemmers

[57] ABSTRACT

Glass tubing that utilizes silica-titania glass as material for the tubing. The tubing of the invention can be formed of a single layer of silica-titania glass or the tubing can be formed in layers, with an outer layer of silica-titania glass and an inner layer of silica glass. The tubing can also be formed with an inner layer of silica-titania glass covered by a layer of silica glass, or the tubing can be formed with three layers, an inner layer and an outer layer of silica-titania glass sandwiching a layer of silica glass. In all embodiments, the resulting tubing has improved mechanical strength or improved chemical durability or both making the tubing useful in a variety of medical and industrial applications.

8 Claims, 1 Drawing Sheet

GLASS TUBING

BACKGROUND OF THE INVENTION

The invention relates to the field of glass capillary tubing for use in a variety of industrial and medical applications in which a liquid or gas is to be conveyed or light is to be guided through the passageway in a tube.

Capillary tubing of silica glass is commonly used in gas and liquid chromatography, in capillary electrophoresis and in mass spectrometry systems to convey a liquid or gas through the tubing. In these applications, the tubing can be used as a substrate tube for the capillary column, as transfer tubing, or as a flow restrictor. Hollow glass tubing is also used to guide light waves and more recently has been used for polycapillary optics focus and to collimate x-rays. The tubes presently used in all these applications are formed from silica glass of the same general composition used in solid core fiber optics. Although silica capillary tubing has been used for many years, it has limited strength, and in some of these applications, the tubing has a relatively short useful life because of the corrosive effect of the liquids and gases that flow through the tubing.

In recent years, there have been developed optical fibers which have a solid core of silica glass doped with titanium dioxide. These fibers have an extremely low coefficient of thermal expansion, and have been termed ultra low expansion fibers. When used as solid fibers for the transmission of light energy, these optical fibers usually consist of a glass that is 80% to 99% silica and 1% to 20% titania. These silica-titania glass fibers have therefore found to be useful in optical fibers for transmission of energy.

Because of the short useful life and limited strength of currently used silica capillary tubing, there is a need for improved capillary tubing which, depending upon the application in which the tubing is used, is more chemical-resistant and thus has a longer useful life than presently known tubing, or which is at least as strong and preferably stronger than presently known silica tubing in those applications where mechanical strength is important.

SUMMARY OF THE INVENTION

The tubing of the invention utilizes silica-titania (titanium silicate) glass as the preferred material for the tubing. If the tubing of the invention is formed of a single layer of silica-titania glass, the tubing is formed by pulling the material into a fiber that has an interior passageway. In the alternative, the tubing of the invention can be formed in layers, with an outer layer of silica-titania glass and an inner layer of silica glass. According to the invention, tubing can also be formed with an inner layer of silica-titania glass covered by a layer of silica glass, or the tubing can be formed with three layers, inner and outer layers of silica-titania glass sandwiching a layer of silica glass. The principles of the invention are applicable to all such tubing, regardless of its cross-sectional shape.

These multiple layered tubes can be formed by any known process such as chemical vapor deposition, modified chemical vapor deposition or outside vapor deposition, or the tubing can be formed by collapsing one material on a core of the other material.

DESCRIPTION OF THE PREFERRED EMBODIMENTS OF THE INVENTION

Throughout this detailed description of the preferred embodiments of the invention, the term "silica-titania glass" or "titanium silicate glass" is used to refer to a glass composition in which silica ($SiO_2$) is doped with titania ($TiO_2$) so that the concentration of titania ($TiO_2$) is in the range of 1%–20% by weight with the balance of 80%–99% being silica. When used in this description, "silica glass" refers to any of various combinations of silica-based glasses commonly known and used in both fiber optics and capillary tubing. However, the optimal combination of these materials when used in the tubing of the invention is where the titanium silicate glass is Corning Incorporated's "ULE™" glass (by weight 92.5% $SiO_2$ and 7.5% $TiO_2$) and where the silica glass is pure (100%) silica.

Figures 1, 2:
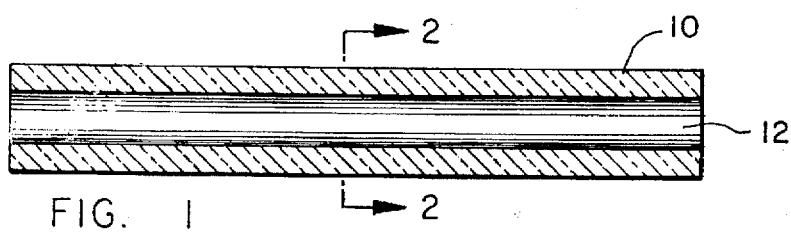
FIG. 1 is a longitudinal sectional view of a first embodiment of the invention in which the tubing is made solely of silica-titania glass.
FIG. 2 is a transverse cross sectional view of the tubing of FIG. 1 taken on the line 2—2 of FIG. 1.

In FIGS. 1 and 2, there is illustrated a capillary tube, which tube may be either flexible or rigid and which has a wall 10 and an interior passageway or bore 12. Although the tubes shown in the various preferred embodiments disclosed herein are illustrated as having a wall 10 that is circular in cross-section, it will be understood that the cross-sectional shape can be of any desired configuration, such as elliptical, square, rectangular, etc, and when the term "annular wall" is used, it refers to and includes a wall of any geometrical configuration. The interior bore 12 provides for the passage of a liquid, a gas or light waves depending upon the use and application for the tubing. In the embodiment of FIGS. 1 and 2, the annular wall 10 is formed entirely from silica-titania glass, with the tubing being formed by pulling the glass into a fiber while retaining the interior bore 12. In this embodiment, the silica-titania glass provides not only improved corrosive resistance to gases or liquid flowing through the bore 12, but the silica-titania glass provides improved overall mechanical strength. The resulting capillary tubing has a longer useful life than presently known and used tubing.

Figures 3, 4:
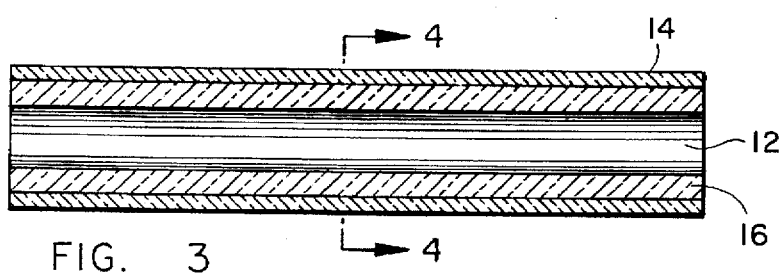
FIG. 3 is a longitudinal sectional view of another embodiment of the invention in which the inner layer is of silica glass and the outer layer of silica-titania glass.
FIG. 4 is a transverse cross sectional view of the tubing of FIG. 3 taken on the line 4—4 of FIG. 3.

In FIGS. 3 and 4, there is illustrated a second embodiment of the invention in which the tubing is comprised of two layers, the outer annular layer 14 which is formed of silica-titania glass while the inner annular layer 16 is formed of silica glass and forms the interior bore 12. By combining the two materials in a layered tubing, overall mechanical strength is improved due to the silica-titania outer annular layer 14 while overall chemical durability of the tube is not affected with the inner layer 16 of silica glass.

Figures 5, 6:
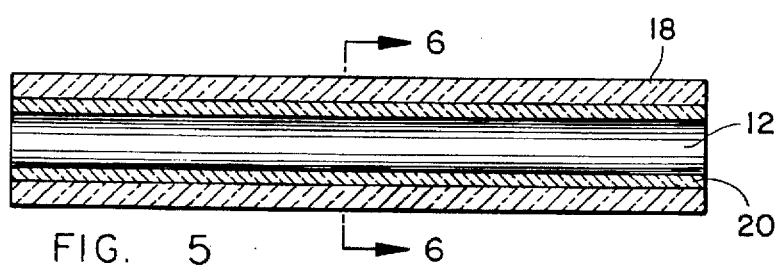
FIG. 5 is another embodiment of the invention in which the silica-titania glass forms the inner layer and the silica glass forms the outer layer.
FIG. 6 is a transverse cross sectional view of the tubing of FIG. 5 taken on the line 6—6 of FIG. 5.

In FIGS. 5 and 6 there is illustrated a third embodiment in which the outer annular layer 18 is formed of silica glass while the inner annular layer 20 is formed of silica-titania glass. The advantages and features of the dual-layered tubing of the embodiment of FIGS. 5 and 6 are substantially similar to those of the embodiment of FIGS. 3 and 4 and in addition, the chemical durability is improved because of the silica-titania inner layer 20. In both embodiments, the inner and the outer layers are preformed by any one of several known vapor deposition techniques, after which the tubing is pulled into a capillary tube. Also, once the inner layer is formed, the outer layer can be collapsed and bonded to the inner layer by known methods.

Figures 7, 8:
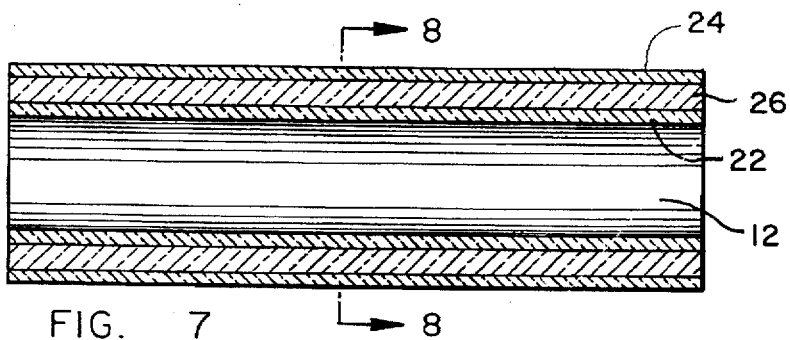
FIG. 7 is a longitudinal cross sectional view of yet another embodiment of the invention in which both the inner and outer layers of the tubing are formed of silica-titania glass while the middle layer is formed of silica glass.
FIG. 8 is a transverse cross sectional view of the tubing of FIG. 7 taken on the line 8—8 of FIG. 7.

FIGS. 7 and 8 illustrate the preferred one of the four different embodiments, this embodiment having an inner annular layer 22 and an outer annular layer 24, both layers 22 and 24 being formed of silica-titania glass. In addition, the tubing of this embodiment has a middle layer 26 of silica glass sandwiched in between the two layers 22 and 24. Because of the two layers of silica-titania glass, this embodiment provides the highest mechanical strength and chemical durability of any of the embodiments.

As previously indicated, tubing of the type to which the invention relates is useful in both gas and liquid chromatography as well as in capillary electrophoresis and mass spectrometry. In each of these applications, the tubing can be used as a substrate tube for the capillary column, as a transfer tube from the gas chromatographer to the mass spectrometer or as a flow restrictor in any of these applications. In addition, the tubing of the invention can also be used as a wave guide for the transmission of infrared energy or in polycapillary optics for focusing and collimating x-ray radiation.

Also, because of its improved mechanical strength and chemical durability, the tubing of the invention can be used as a replacement for metal and plastic tubing where tubing with precision small bores are necessary. Because of the fragility of common silica glass, metal and plastic tubing are currently the preferred materials in these applications, but with the addition of one or more layers of silica-titania glass as taught herein, glass tubing may be preferred, especially in those applications where chemical resistivity is important. This type of precision, small bore tubing has many industrial applications.

From the foregoing description, it will be evident to those skilled in the art that there are many applications for the various embodiments of the invention. It will be further evident to those skilled in the art that various revisions and modifications can be made to the embodiments described herein without departing from the spirit and scope of the invention. For example, although the preferred embodiments of the invention have been illustrated for tubing having a circular cross-sectional shape, the principles of the invention are fully applicable to all configurations, such as elliptical, square or rectangular tubing. It is my intention however that all such revisions and modifications that are obvious to those skilled in the art will be included within the scope of the following claims.

What is claimed is as follows:

1. Glass tubing for conveying fluids or guiding light waves, said tubing comprising an annular wall of silica-titania glass, said tubing having an interior passageway through which the fluids or light waves can pass, the annular wall of silica-titania glass having a concentration of titania ($TiO_2$) in the range of 1%–20% by weight with the balance of 80%–99% being silica ($SiO_2$), and a second annular wall of silica glass, the second annular wall being contiguous with the annular wall of silica-titania glass.

2. The glass tubing of claim 1 in which the second annular wall of silica glass forms an inner wall that defines the interior passageway, and the annular wall of silica-titania glass forms an outer wall.

3. The glass tubing of claim 2 in which the annular wall of silica-titania glass has a concentration of titania ($TiO_2$) of 7.5% by weight with the balance of 92.5% being silica ($SiO_2$).

4. The glass tubing of claim 1 in which the second annular wall of silica glass forms the outer wall and the annular wall of silica-titania glass forms the inner wall and defines the interior passageway.

5. The glass tubing of claim 4 in which the annular wall of silica-titania glass has a concentration of titania ($TiO_2$) of 7.5% by weight with the balance of 92.5% being silica ($SiO_2$).

6. The glass tubing of claim 1 in which the tubing has a third annular wall which is formed of silica-titania glass and is contiguous with the second annular wall of silica glass, and one of the annular walls of silica-titania glass forms the inner wall and defines the interior passageway while the other annular wall of silica-titania glass forms an outer wall.

7. The glass tubing of claim 6 in which the annular walls of silica-titania glass have a concentration of titania ($TiO_2$) of 7.5% by weight with the balance of 92.5% being silica ($SiO_2$).

8. The glass tubing of claim 1 in which the annular wall of silica-titania glass has a concentration of titania ($TiO_2$) of 7.5% by weight with the balance of 92.5% being silica ($SiO_2$).

* * * * *